United States Patent
Hess et al.

[15] 3,638,116
[45] Jan. 25, 1972

[54] WATT-HOUR METERS WITH PHASING PLATE PHASED AFTER METER COMPLETION

[72] Inventors: Hugo J. A. Hess, Steinhusen, Switzerland; James W. Milligan; Harvey L. Friend, both of Lafayette, Ind.

[73] Assignee: Duncan Electric Company, Inc., Lafayette, Ind.

[22] Filed: Sept. 26, 1969

[21] Appl. No.: 870,658

[52] U.S. Cl. ............................................. 324/138, 324/74
[51] Int. Cl. ............................... G01r 11/02, G01r 35/04
[58] Field of Search ........................................... 324/74, 138

[56] References Cited

UNITED STATES PATENTS

| 2,321,437 | 6/1943 | Trekell | 324/138 |
| 2,336,834 | 12/1943 | Bakke | 324/138 |
| 2,836,795 | 5/1958 | Busch | 324/138 |

OTHER PUBLICATIONS

Duncan Brochure; presented to "EEI– AEIC Meter & Service Committees" Sept. 23, 1968.

Primary Examiner—Alfred E. Smith
Attorney—Darbo, Robertson & Vandenburgh

[57] ABSTRACT

The phasing of electricity meters (watt-hour meters) i.e., producing the proper phase relationship between its two interacting alternating magnetic fields, is performed by a punching operation after the meter is fully assembled. A lag plate in the form of a conductive loop which surrounds the central pole of the voltage magnet is provided with a tail into the base of which extends a slot opening from the opening of the loop. The slot can be extended outwardly from the loop by successive nibbles of a punch to increase the length of the current path around the loop. This increases the resistance and decreases the current and the lag effect. This slotted tail is now so positioned (and bent upwardly) as to be accessible from the top of the fully assembled meter, using a slim punching tool inserted downwardly through a narrow passage between the parts. The fully assembled meter is tested and the slot is then lengthened by an amount calculated from the test results, a second test and second calculated lengthening being expectable to achieve desired accuracy. The entire testing, inserting and lengthening operation can be computer-controlled.

5 Claims, 4 Drawing Figures

PATENTED JAN 25 1972

3,638,116

Hugo J. A. Hess
James W. Milligan
Harley L. Friend
By Darbo, Robertson & Vandenburgh Attys

WATT-HOUR METERS WITH PHASING PLATE PHASED AFTER METER COMPLETION

INTRODUCTION

The invention of which this disclosure is offered for public dissemination in the event adequate patent protection is available relates to improved accuracy adjustment in watt-hour meters, particularly the phasing adjustment. The watt-hour meter is familiarly known to home owners as the electricity meter. Such meters have long been provided with various adjustment devices for achieving greater accuracy than would otherwise be possible.

The phasing adjustment involves adjusting the resistance of a lag loop. Sometimes there have been two lag loops, one adjustable as to its resistance and one not. One most common method of adjustment involved twisting or untwisting a pigtail formed by twisting together the ends of the wire to form the loop. Metering constancy requires that the pigtail be soldered, and the desire to avoid soldering has long inspired efforts to devise other satisfactory forms of phasing adjustment.

One of these other forms made adjusting alterations in a more rigid form of lag loop known as a lag plate. This has had some disadvantages. One form tended to be less exact than the twisting pigtail type because this form was subject to change only by increments of fixed amounts. These had to be made before complete assembly of the meter, with some risk of further inaccuracy for that reason.

According to the present invention, phasing by altering the lag plate is provided, but without either of these disadvantages.

In the past the lag plate has often served as a light load adjustment. This involved physically shifting this plate, often called a "light load plate." If the plate is to be altered for phasing, rigid and unvarying mounting of that plate is desired. Accordingly some other form of light load adjustment should be provided. That disclosed here has already been made the subject of an application filed by James W. Milligan, Russell F. Graefnitz and George N. Burkhart, Jr.

Additional objects and advantages of the invention will be apparent from the following description and from the drawings.

DESIGNATION OF FIGURES

BACKGROUND DESCRIPTION

Figure 1:
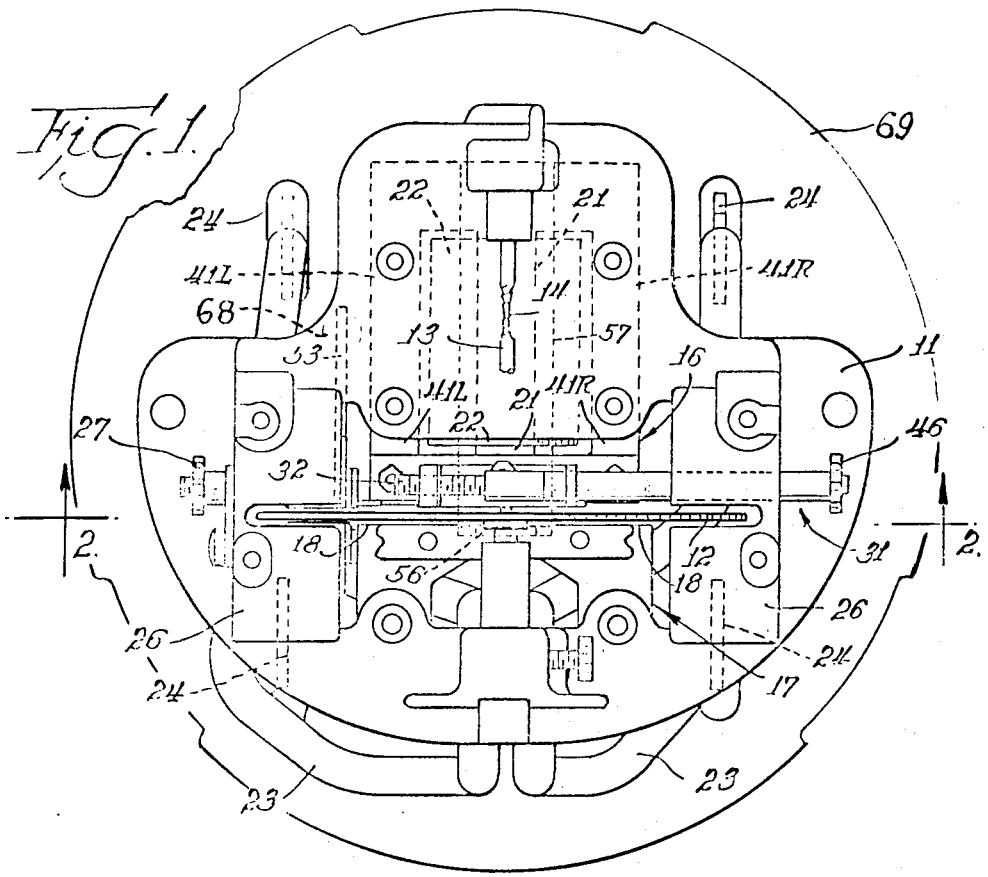
FIG. 1 is a front view of a meter element embodying a preferred form of the present invention, with insertion of a phasing punch being indicated.

The meter element illustrated includes a frame 11 by which a disk 12 is rotatably carried. The disk is driven by interaction between a voltage magnet 16 and a current magnet 17. The current magnet has a pair of pole faces 18 forming one side of the gap in which the disk rotates, and the voltage magnet has a central pole face 19, seen best in FIG. 2, forming the opposite side of the disk-receiving gap. The pole face 19 is located at the end of a central leg 21 of the voltage lamination stack, this leg carrying a voltage coil 22, which contributes the portion of the meter energization representing the voltage in the circuit being measured. The current in the circuit being measured is carried by the current coil conductors 23. These may be called the current coil, although in the illustrated form of meter they do not look much like a coil inasmuch as each comprises a coil of only a single turn, passing once through the aperture of the C-shaped current lamination stack. Each of the current conductors 23 is connected between two terminal blades 24, by which the meter may be plugged into a socket in conventional manner.

As is well known, each of the coils 22 and 23 causes flux to pass through the disk. Flux from each source produces eddy currents in the disk, which eddy currents react with flux from the other source to drive the disk. Accuracy of the meter depends on having the two fluxes in exactly the right phase relationship to each other. It is conventional to provide some way to adjustably lag the voltage flux to achieve this "phasing."

The disk also rotates through gaps in one or more damping magnet assemblies 26 for retarding the disk 12 to make its speed of rotation proportional to the momentary power use in the circuit being measured. At least one damping unit 26 is provided with a full load adjustment 27. It has been conventional for quite a few decades to provide a separate light load adjustment. Most light load adjustments of the past used shifting plates, the plate usually being a conductive-loop, together with a wide variety of relatively complex mechanisms for shifting the plate with the necessary delicacy and dependability of adjustment. The conductive light load plates also served as lag plates. There also have been lag plates designed for removal or shearing of metal or like change to provide the above-mentioned phasing adjustment.

Although the following disclosure offered for public dissemination is detailed to ensure adequacy and aid understanding, this is not intended to prejudice that purpose of a patent which is to cover each new inventive concept therein no matter how others may disguise it by variations in form or additions or further improvements. The claims at the end hereof are intended as the chief aid toward this purpose as it is these that meet the requirement of pointing out the parts, improvements or combinations in which the inventive concepts are found. To meet the statutory requirement of setting forth the best mode contemplated, improvements by associates may be disclosed here without being specified in the present claims.

PREFERRED LIGHT LOAD ADJUSTMENT

The preferred light load adjustment for use with the present invention is one which does not move a conductive plate. An example, the subject of a separate application, is seen best in FIG. 2. Essentially, the light load adjustment comprises a screw unit 31, the most important portions of which are a magnetic screw 32 and a copper sleeve 33 firmly secured on the screw. The screw is carried by a bracket 34 which is secured to the lamination of the voltage magnet 16. The screw 32 has antibacklash threaded engagement. As now planned, there is threaded engagement with both a main bend 36 and a return bend 37 of bracket 34. These may both be threaded, with the threads out of step with one another so as to be resiliently flexed with respect to one another when engaging the screw. Alternatively, bend 37 may be bifurcated and reshaped or dimensioned to be sprung by the screw. Thus the thread surfaces of the screw are in either case engaged under elastic tension so that backlash is eliminated.

The screw unit 31, and more specifically the shaft 35, drilled to provide a sleeve portion 38 holding the shank of screw 32, has a snug fit with an aperture through the other bend 39 of bracket 34. The sleeve 38 is nonmagnetic so that screw 32 provides near symmetry when centered. Shaft 35 is preferably aluminum, and although its conductivity is not nearly that of copper, sleeve 38 supplements the main conductivity of the sleeve 33. Sleeves 33 and 38 may both be rolled into grooves 40 to lock the parts of screw unit 31 firmly together.

Figure 2:
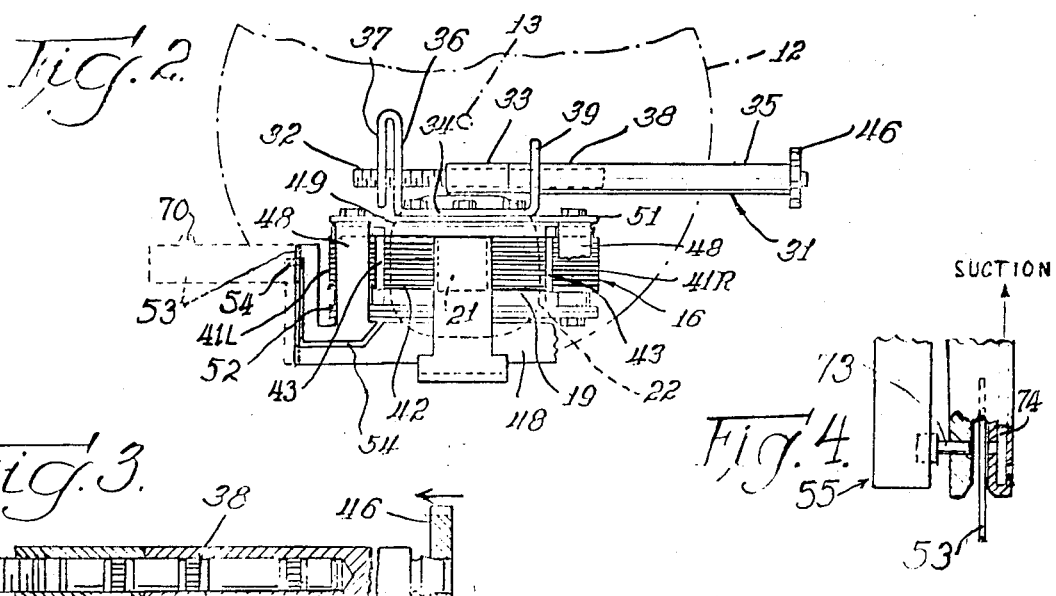
FIG. 2 is a view looking at the lower face of the voltage magnet of FIG. 1, the disk being represented by broken lines, thus corresponding approximately to a view looking upwardly from the plane 2—2 of FIG. 1.
Figure 3:
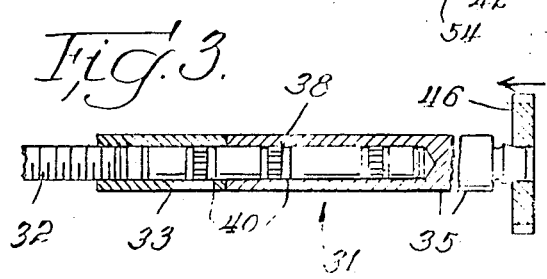
FIG. 3 is a sectional view longitudinally of the screw unit on an enlarged scale showing its preferred assembly.
Figure 4:
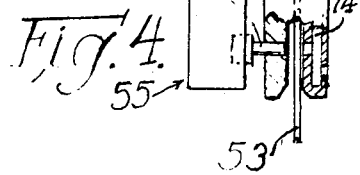
FIG. 4 is a fragmentary view of a preferred punch.

As is apparent from both FIGS. 1 and 2, the magnet screw 32 extends transversely with respect to the vertically extending central core leg 21. Thus it also extends toward the side legs 41L and 41R of voltage magnet 16. These may be jointly spoken of as the side legs 41. The lamination stack of magnet 16 is of E-shaped the three legs 21 and 41 being joined at the top.

The central leg 21 has at the bottom thereof a laminated pole piece 42, and in fact it is the bottom of this pole piece which is the pole face 19. Between the terminal portions of the poles of legs 41L and 41R, respectively, and pole piece 42, are air gaps 43. These airgaps, although narrow, are enough to cause much of the flux passing through pole piece 42 to choose the path through disk 12. Besides thus causing useful flux to pass through the disk, the air gaps 43 also cause considerable leakage flux to pass directly from the sides of pole piece 42 to the side legs 41L and 41R.

As seen in FIG. 2, the magnetic screw 32 is located where it would pick up much of this leakage flux. Even though the screw 32 is spaced considerably further from the lamination than the width of gap 43, its permeance still causes it to collect or carry much of the leakage flux which would otherwise be present in the air anyway. At the same time, the spacing of screw 32 is far enough from the lamination so that it does not objectionably divert a substantial percentage of the flux which would otherwise be useful flux passing through the disk. One test tends to indicate that the increased diversion accounts for less than an eighth of the total effect, thus indicating that lagging of the flux which would be leaking anyway contributes greatly to the total range of adjustment.

Were the sleeve 33 somewhat to the right of center as seen in FIG. 2, much of the flux between stack leg 41L and central pole piece 42 (or central leg 21) will pass into and out of screw 32 without passing through sleeve 33. So will some of the flux, but a smaller proportion thereof, passing between outside stack leg 41R and central pole piece 42. It follows that lag sleeve 33 will have a phase-lagging effect on more of the flux involving right-hand stack leg 41R than of the flux involving left-hand stack leg 41L. The difference will be increased by turning screw 31 in a direction to screw it to the right, and will be decreased by screwing it to the left. As sleeve 33 passes a neutral position, nearly centered, it will begin to cause more lagging of the flux involving left-hand side leg 41L than of flux involving right-hand leg 41R. The exact position of screw unit 31 at which the transition of the greater effect from one side to the other occurs probably is not with the sleeve 33 exactly centered. One reason is that sleeve 38 has an influence and bends 36, 37 and 39 also have an influence since bracket 34 is made of conductive nonmagnetic metal such as red brass. Even the eddy currents within screw 32, which would be concentric with its axis, may add slightly to the total lagging effect. Preferably sleeve 33 is approximately centered on screw 32. There is no need to know where the transition occurs as to which side of center is lagged most because the change is smooth and continuous. Indeed, a given amount of turning of screw 31 has nearly the same effect throughout all or nearly all of its available range of adjustment, this "linear characteristic" being very desirable.

Because the face of the meter as seen in FIG. 1 is the front, the screw 32 extends laterally of the meter. Inasmuch as access from the side of the meter is not always convenient, the screw is provided with a head 46 having radial slots along its periphery so that a screwdriver may be inserted into the slot from the front and by tipping the screwdriver rather than turning it about its own axis the head 46 may be turned and the screw unit 31, including its sleeves 33 and 38, may be laterally adjusted or screwed one way or the other.

FIXED LAG PLATE ARRANGED FOR PUNCHING IN COMPLETED METER

Because an adequate range of light load adjustment can be obtained by a screw unit such as unit 31, it now becomes entirely satisfactory to mount the lag plate 48 as a fully fixed part of the voltage magnet assembly 16. To this end, the side 49 of the rectangular lag loop nearest the screw 32 is bent upwardly and mounted between the lamination stack and a nonmagnetic tie plate 51. Similar nonmagnetic tie plates 52 are provided at the far side of the stack of laminations, and bolts or rivets extending through the entire assembly hold all parts firmly together. Some of these also extend through bracket 34, firmly securing it to the assembly.

According to the present invention the lag plate 48 is formed with a tail 53, and with a slot 54 extending into the base of this tail. By extending the slot 54 further along the tongue, the amount of lag can be decreased. Therefore by designing the lag plate 54 so that initially it always provides a slight excess of lagging, the slot can be extended to provide accurate lag. An important consideration is that the extending of the slot be done after the meter has been fully assembled, so that the meter can be tested in its final condition. The space within a meter is so well occupied that this at first seemed relatively impossible. In order to achieve it the tail 53, including the tip portion of the slot 54, is bent upwardly, parallel to leg 41L, where a slim punching tool represented at 55 can be slipped into the fully assembled meter from its top to extend the slot 54 as needed for accuracy. This in turn is facilitated by the fact that the lag plate is rigidly mounted so that the bent up tail will always be in a predetermined position within the meter. The tail 53 may extend out from any point on the loop where, when suitably bent, it will be accessible to the tool after complete assembly of the meter, everything being in place except its glass cover. In FIG. 1 it is shown in its now intended position. The tail 53 is near the middle of the space conventionally found to the left of the side leg 41L of the voltage magnet.

One form of connection between the lag plate and the tail is shown in FIG. 2. The dotted lines indicate the form of the blank before bending, and of course before insertion in the mechanism. This shape is to avoid unbalance between the two sides of the potential electromagnet, the slot 54 following a path around the gap below the side leg 41L. However, where tests show that no objectionable unbalance results, or that it can be avoided by compensating change at the opposite side, a simpler construction, with tail 53 extending directly from the closest point of lag plate 48 is preferred.

The upper tip of tail 53 may be positioned accurately by having it interlock with a post 68 molded as part of baseplate 69. One or more small lugs 70 along the edge of tail 53 extending into the post 68 may ensure three-dimensional accuracy.

The tool 55 which is inserted from above for punching the tail 53 to extend slot 54 preferably includes a punch pin 73 on one side of the tail 53 and a die tube 74 on the other side. The slugs nibbled from the tail 53 are pushed into tube 64. Air is drawn up through the tube to carry the slugs to a vacuum-cleaner receiver.

The tool 55 could be operated by hand, but is preferably mounted on a fixed slideway and operated mechanically and automatically under computer control. This computer control can be an extension of the practice set forth in U.S. Pat. No. 3,409,829, Elmore, Friend and Pitt.

With tool 55 entirely withdrawn, the meter is tested and the correct lengthening of slot 54 determined by calculations based on the test results. Tool 55 is then inserted to its limit of movement and its punch lug 63 operated to punch through tail 53 to lengthen slot 54. Tool 55 is moved by successive withdrawal steps and operated to lengthen the slot by nibbles, the last such step being accurately determined (usually less than a full step) according to the calculation. It is then fully withdrawn, and the meter tested again. The adjustment process can be repeated until the desired high standard of accuracy is achieved, usually by the second adjustment. The first adjustment may be purposely calculated to stop short, perhaps by 10 percent, of the adjustment that would have been needed to achieve accuracy. This is to be sure the nibbling is not carried too far.

ACHIEVEMENT

From the foregoing disclosure it is apparent that an extremely satisfactory phasing adjustment has been provided, one which is inexpensive to manufacture, and which is nevertheless exceedingly satisfactory in all characteristics. It is especially advantageous in that the tail 53 is so positioned as to make practical the punching of the tail after the meter mechanism is fully assembled. Thus the completed meter can be tested with dependable accuracy before the punching, or for successive punchings, as described. It thus becomes possible to perform the entire phasing operation as part of the calibration procedure, with the meter on the test rack, and in a manner lending itself to the use of automatic equipment. The test can include the usual runs, with unity power factor at two current loads and 50 percent power factor at the heavier current load, with calculations for interaction in determining the corrections. Accuracy is achieved with exceptional dependability.

We claim:

1. The method of manufacturing accurately phased watthour meters comprising assembling a complete meter unit having therein a baseplate and complete measuring assembly carried thereon, including a phasing loop including as part of its circuit a phasing strip, free from demarcations determining incremental minimums of adjustment, in a position admitting entry of a tool into the complete meter unit to engage said strip, testing the completed meter with test runs as customary for full load calibration, inserting the tool and separating portions of the strip to alter the resistance of the loop by an amount based on the results of the test; choosing the extent of separation operation independently of any strip demarcations which would preclude substantially infinitesimal variations; and repeating test run testing and separating operation when needed for accuracy.

2. The method of manufacturing accurately phased watthour meters comprising assembling a complete meter unit having therein a baseplate and complete measuring assembly carried thereon, including a phasing loop including as part of its circuit a phasing strip, free from demarcations determining incremental minimums of adjustment, in a position admitting entry of a tool into the complete meter unit to engage said strip, testing the completed meter with test runs as customary for full load calibration, inserting a tool comprising a punch and a slug-collector for separating portions of the strip, by punching slugs into the collector, to alter the resistance of the loop by an amount based on results of the test.

3. The method of manufacturing accurately phased watthour meters comprising assembling a complete meter unit having therein a baseplate and complete measuring assembly carried thereon, including a phasing loop including as part of its circuit a phasing strip, free from demarcation determining incremental minimums of adjustment, in a position admitting entry of a tool into the complete meter unit to engage said strip, testing the completed meter with test runs as customary for full load calibration, inserting a tool comprising a punch and a vacuum slug-collector for separating portions of the strip, by punching slugs into the collector, to alter the resistance of the loop by an amount based on results of the test.

4. The method of manufacturing accurately phased watthour meters comprising assembling a complete meter unit having therein a baseplate and complete measuring assembly carried thereon, including a phasing loop including as part of its circuit an elongate phasing strip, free from demarcations determining incremental minimums of adjustment, in a position extending outwardly from its base, testing the completed meter in a comparative test run manner suitable for load-accuracy calibration, inserting a slim tool comprising a punch and a vacuum slug-collector into the meter endwise and along the longitudinal axis of the strip, telescoping this tool over the strip, for separating portions of the strip progressively from its base by punching slugs into the collector, to alter the resistance of the loop by an amount based on results of the test.

5. The method of manufacturing accurately phased watthour meters comprising assembling a complete meter unit having therein a baseplate and complete measuring assembly carried thereon, including a phasing loop including as part of its circuit an elongate phasing strip, free from demarcations determining incremental minimums of adjustment, in a position extending outwardly from its base, testing the completed meter in a comparative test run manner suitable for load-accuracy calibration, inserting a slim tool comprising a punch and a vacuum slug-collector into the meter endwise and along the longitudinal axis of the strip, telescoping this tool over the strip, for separating portions of the strip progressively from its base by punching slugs into the collector, to alter the resistance of the loop by an amount based on results of the test; removing the tool; retesting the meter in such test run manner, and reinserting the tool and punching further when needed for accuracy as determined by the retesting.

* * * * *